(12) United States Patent
Ragupathy et al.

(10) Patent No.: US 10,733,329 B1
(45) Date of Patent: Aug. 4, 2020

(54) ROBOTIC PROCESS AUTOMATION SYSTEM AND METHOD WITH SECURE CREDENTIAL VAULT

(71) Applicant: Automation Anywhere Inc., San Jose, CA (US)

(72) Inventors: Badrinath Ragupathy, Sunnyvale, CA (US); Rajaa Mohamad Abdul Razack, Dublin, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 230 days.

(21) Appl. No.: 15/957,917

(22) Filed: Apr. 20, 2018

(51) Int. Cl.
*G06F 21/78* (2013.01)
*B25J 13/06* (2006.01)
*G06F 21/45* (2013.01)

(52) U.S. Cl.
CPC .............. *G06F 21/78* (2013.01); *B25J 13/06* (2013.01); *G06F 21/45* (2013.01)

(58) Field of Classification Search
CPC ............ G06F 21/78; G06F 21/45; B25J 13/06
See application file for complete search history.

(56) References Cited

U.S. PATENT DOCUMENTS

| | | | | |
|---|---|---|---|---|
| 5,560,008 A | * | 9/1996 | Johnson | G06F 21/6218 709/229 |
| 5,604,490 A | * | 2/1997 | Blakley, III | G06F 21/41 340/5.74 |
| 5,757,920 A | * | 5/1998 | Misra | G06F 21/33 705/76 |
| 5,764,890 A | * | 6/1998 | Glasser | G06F 21/31 713/155 |
| 5,768,504 A | * | 6/1998 | Kells | G06F 21/41 726/6 |
| 5,774,551 A | * | 6/1998 | Wu | G06F 21/31 713/155 |

(Continued)

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

(Continued)

*Primary Examiner* — J. Brant Murphy
(74) *Attorney, Agent, or Firm* — Prasad IP, PC

(57) ABSTRACT

A robotic process automation system with improved security in the form of a credential vault includes data storage for storing bots. The data storage also stores credentials in encrypted form where the credentials are not associated with any of the plurality of bots. The credentials include standard credentials and user specific credentials. A processor is operatively coupled to the data storage and is configured to execute instructions that when executed cause the processor to provide to an administrator a control console. The instructions implement a standard credential generator and a user specific credential generator, to generate a user specific credential template useable by a user to enter credentials specific to the user. The instructions also implement a configurable locker that is stored in encrypted form in the data storage to associate a set of users as a group and to provide selected standard credentials to the group.

20 Claims, 15 Drawing Sheets

(56) References Cited

U.S. PATENT DOCUMENTS

| | | | | |
|---|---|---|---|---|
| 5,949,999 A * | 9/1999 | Song | G06F 11/3664 | 714/E11.208 |
| 5,983,001 A * | 11/1999 | Boughner | G06F 9/45512 | 714/38.1 |
| 6,133,917 A * | 10/2000 | Feigner | G06F 9/453 | 715/708 |
| 6,144,959 A * | 11/2000 | Anderson | G06F 21/31 | |
| 6,389,592 B1 * | 5/2002 | Ayres | G06F 8/658 | 717/172 |
| 6,427,234 B1 * | 7/2002 | Chambers | G06F 9/45516 | 717/140 |
| 6,473,794 B1 * | 10/2002 | Guheen | H04L 41/22 | 709/223 |
| 6,496,979 B1 * | 12/2002 | Chen | G06F 8/61 | 717/178 |
| 6,640,244 B1 * | 10/2003 | Bowman-Amuah | G06F 9/466 | 707/999.01 |
| 6,704,873 B1 * | 3/2004 | Underwood | H04L 63/02 | 709/223 |
| 6,898,764 B2 * | 5/2005 | Kemp | G06F 8/71 | 715/762 |
| 7,091,898 B2 * | 8/2006 | Arling | G08C 17/00 | 340/12.28 |
| 7,246,128 B2 * | 7/2007 | Jordahl | G06F 16/24578 | |
| 7,441,007 B1 * | 10/2008 | Kirkpatrick | G06F 9/44505 | 709/213 |
| 7,533,096 B2 * | 5/2009 | Rice | G06F 16/90335 | |
| 7,568,109 B2 * | 7/2009 | Powell, Jr. | G06F 8/36 | 713/187 |
| 7,765,525 B1 * | 7/2010 | Davidson | G06F 11/3636 | 717/110 |
| 7,805,317 B2 * | 9/2010 | Khan | G01C 21/3605 | 705/1.1 |
| 7,805,710 B2 * | 9/2010 | North | G06F 9/45516 | 711/118 |
| 7,810,070 B2 * | 10/2010 | Nasuti | G06F 11/3688 | 717/124 |
| 7,846,023 B2 * | 12/2010 | Evans | A63F 13/12 | 463/42 |
| 8,028,269 B2 * | 9/2011 | Bhatia | G06F 11/3604 | 717/101 |
| 8,056,092 B2 * | 11/2011 | Allen | G06F 8/38 | 719/320 |
| 8,095,910 B2 * | 1/2012 | Nathan | G06F 8/24 | 717/107 |
| 8,132,156 B2 * | 3/2012 | Malcolm | G06F 11/3688 | 717/122 |
| 8,234,622 B2 * | 7/2012 | Meijer | G06F 8/36 | 717/104 |
| 8,438,558 B1 * | 5/2013 | Adams | G06F 8/658 | 717/170 |
| 8,443,291 B2 * | 5/2013 | Ku | G06F 8/38 | 715/762 |
| 8,464,240 B2 * | 6/2013 | Fritsch | G06F 8/65 | 717/168 |
| 8,498,473 B2 * | 7/2013 | Chong | G06K 9/4652 | 382/162 |
| 8,504,803 B2 * | 8/2013 | Shukla | G06F 9/4843 | 707/718 |
| 8,682,083 B2 * | 3/2014 | Kumar | G06K 9/6202 | 382/218 |
| 8,769,482 B2 * | 7/2014 | Batey | G06F 8/36 | 717/104 |
| 8,965,905 B2 * | 2/2015 | Ashmore | G06F 11/34 | 707/748 |
| 9,213,625 B1 * | 12/2015 | Schrage | G06F 11/3688 | |
| 9,278,284 B2 * | 3/2016 | Ruppert | G06F 8/60 | |
| 9,444,844 B2 * | 9/2016 | Edery | G06F 21/51 | |
| 9,462,042 B2 * | 10/2016 | Shukla | H04L 67/10 | |
| 2003/0033590 A1 * | 2/2003 | Leherbauer | G06F 8/71 | 717/122 |
| 2003/0101245 A1 * | 5/2003 | Srinivasan | G06F 9/44505 | 709/221 |
| 2003/0159089 A1 * | 8/2003 | DiJoseph | G06F 11/3664 | 714/38.1 |
| 2004/0083472 A1 * | 4/2004 | Rao | G06F 8/65 | 717/171 |
| 2004/0172526 A1 * | 9/2004 | Tann | G06F 9/44547 | 713/2 |
| 2004/0210885 A1 * | 10/2004 | Wang | G06F 8/71 | 717/158 |
| 2004/0243994 A1 * | 12/2004 | Nasu | G06F 8/65 | 717/171 |
| 2005/0188357 A1 * | 8/2005 | Derks | G06F 11/3692 | 717/124 |
| 2005/0204343 A1 * | 9/2005 | Kisamore | G06F 11/3688 | 717/124 |
| 2005/0257214 A1 * | 11/2005 | Moshir | G06F 8/62 | 717/171 |
| 2006/0095276 A1 * | 5/2006 | Axelrod | G06Q 99/00 | 717/104 |
| 2006/0150188 A1 * | 7/2006 | Roman | G06F 9/4887 | 718/104 |
| 2007/0101291 A1 * | 5/2007 | Forstall | G06F 3/0482 | 715/805 |
| 2007/0112574 A1 * | 5/2007 | Greene | H04W 12/0027 | 340/572.1 |
| 2008/0005086 A1 * | 1/2008 | Moore | G06F 16/955 | |
| 2008/0028392 A1 * | 1/2008 | Chen | G06F 8/61 | 717/175 |
| 2008/0209392 A1 * | 8/2008 | Able | G06F 8/34 | 717/105 |
| 2008/0222454 A1 * | 9/2008 | Kelso | G06F 11/3684 | 714/38.14 |
| 2008/0263024 A1 * | 10/2008 | Landschaft | G06F 16/9537 | |
| 2009/0037509 A1 * | 2/2009 | Parekh | H04M 1/72525 | 709/201 |
| 2009/0103769 A1 * | 4/2009 | Milov | G06F 9/45512 | 382/100 |
| 2009/0172814 A1 * | 7/2009 | Khosravi | G06F 21/51 | 726/23 |
| 2009/0199160 A1 * | 8/2009 | Vaitheeswaran | G06F 11/3414 | 717/124 |
| 2009/0217309 A1 * | 8/2009 | Grechanik | G06F 8/38 | 719/328 |
| 2009/0249297 A1 * | 10/2009 | Doshi | G06F 11/3668 | 717/124 |
| 2009/0313229 A1 * | 12/2009 | Fellenstein | G06F 8/63 | |
| 2009/0320002 A1 * | 12/2009 | Peri-Glass | G06F 8/38 | 717/131 |
| 2010/0023602 A1 * | 1/2010 | Martone | G06F 8/60 | 709/220 |
| 2010/0023933 A1 * | 1/2010 | Bryant | G06Q 10/06 | 717/168 |
| 2010/0100605 A1 * | 4/2010 | Allen | H04L 67/1095 | 709/217 |
| 2010/0235433 A1 * | 9/2010 | Ansari | H04L 12/2803 | 709/203 |
| 2011/0022578 A1 * | 1/2011 | Fotev | G06F 16/3331 | 707/706 |
| 2011/0145807 A1 * | 6/2011 | Molinie | G06F 8/65 | 717/170 |
| 2011/0197121 A1 * | 8/2011 | Kletter | G06F 40/194 | 715/234 |
| 2011/0276568 A1 * | 11/2011 | Fotev | G06F 16/951 | 707/728 |
| 2011/0276946 A1 * | 11/2011 | Pletter | G06F 11/3688 | 717/124 |
| 2011/0296440 A1 * | 12/2011 | Laurich | G06F 21/602 | 719/326 |
| 2011/0302570 A1 * | 12/2011 | Kurimilla | G06F 8/60 | 717/170 |
| 2012/0042281 A1 * | 2/2012 | Green | G06F 9/454 | 715/810 |
| 2012/0124062 A1 * | 5/2012 | Macbeth | G06F 9/445 | 707/749 |

(56) References Cited

U.S. PATENT DOCUMENTS

| | | | | |
|---|---|---|---|---|
| 2012/0330940 A1* | 12/2012 | Caire | ..................... | G06Q 10/06 707/723 |
| 2013/0151010 A1* | 6/2013 | Kubota | ................... | B25J 13/06 700/264 |
| 2013/0173648 A1* | 7/2013 | Tan | ........................ | G06F 16/27 707/758 |
| 2013/0290318 A1* | 10/2013 | Shapira | .............. | G06F 16/2465 707/723 |
| 2014/0181705 A1* | 6/2014 | Hey | ................... | G06F 11/3672 715/764 |
| 2015/0082280 A1* | 3/2015 | Betak | ................ | G06F 11/3692 717/124 |
| 2015/0347284 A1* | 12/2015 | Hey | ................... | G06F 11/3692 717/125 |
| 2016/0019049 A1* | 1/2016 | Kakhandiki | ............ | G06F 8/658 717/168 |
| 2016/0078368 A1* | 3/2016 | Kakhandiki | ........... | G06N 20/00 706/12 |
| 2016/0094546 A1* | 3/2016 | Innes | .................. | H04L 63/0823 713/156 |
| 2017/0019386 A1* | 1/2017 | Ylonen | ................. | H04L 9/0891 |
| 2017/0291295 A1* | 10/2017 | Gupta | ................... | B25J 9/0081 |
| 2018/0375886 A1* | 12/2018 | Kirti | .................. | H04L 63/1425 |

OTHER PUBLICATIONS

Zhifang et al., Test automation on mobile device, May 2010, 7 pages.

Hu et al., Automating GUI testing for Android applications, May 2011, 7 pages.

Tom Yeh, Tsung-Hsiang Chang, and Robert C. Miller, Sikuli: Using GUI Screenshots for Search and Automation, Oct. 4-7, 2009, 10 pages.

Bergen et al., RPC automation: making legacy code relevant, May 2013, 6 pages.

* cited by examiner

| | View locker | Edit locker | Delete locker | Add participant / owner | Remove participant / owner | View credential | Assign credential | Remove credential | User – specific value | Common Value |
|---|---|---|---|---|---|---|---|---|---|---|
| Consume | N | N | N | N | N | Y | N | N | Y | N |
| Participate | N | N | N | N | N | Y | Y | N | N | Y |
| Own | Y | Y | Y | Y | Y | Y | Y | Y | N | Y |
| Share | Y | Y | Y | Y | Y | Y | Y | Y | N | Y |
| Admin | Y | Y | Y | Y | Y | Y | Y | Y | N | Y |

FIG. 2B

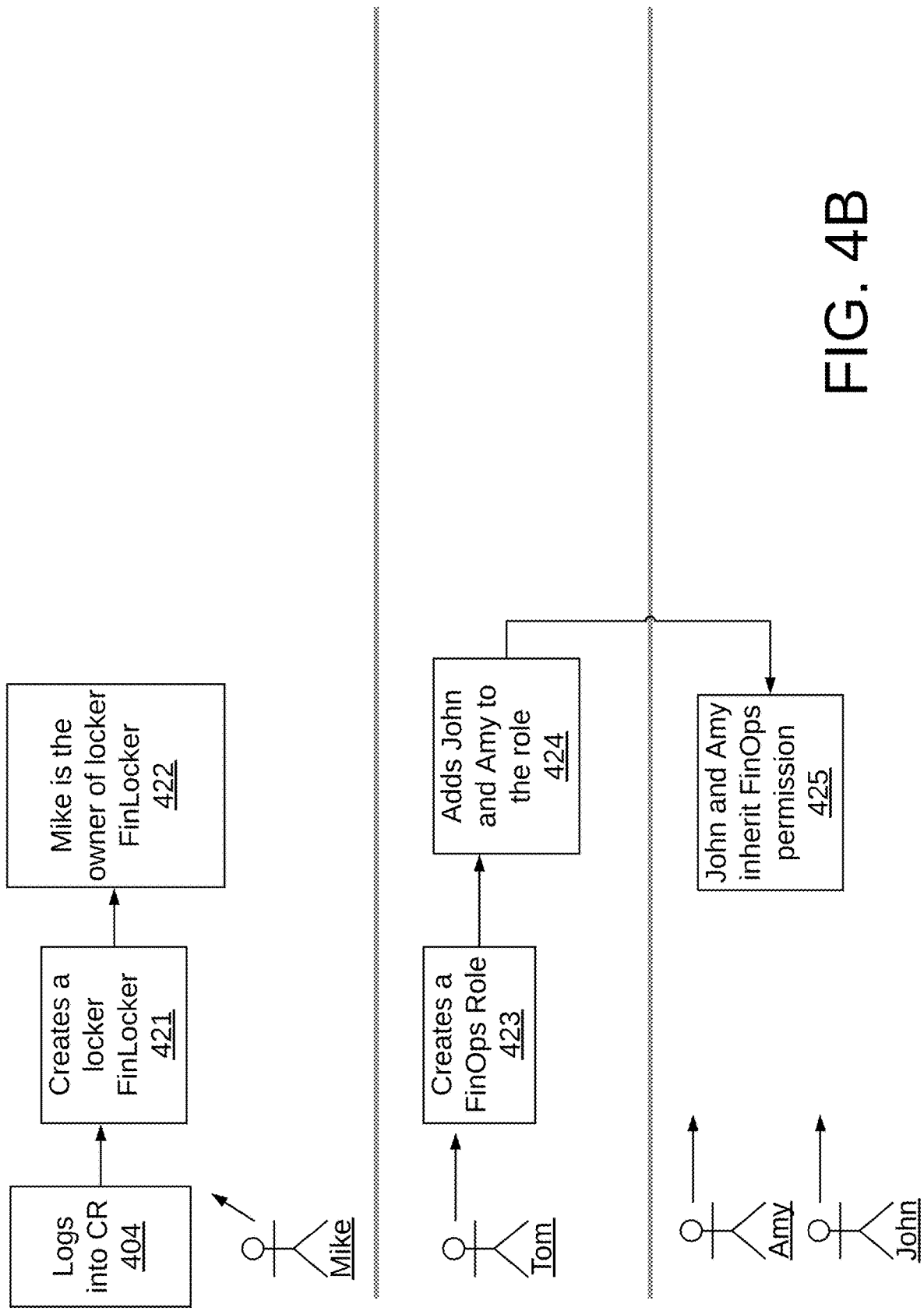

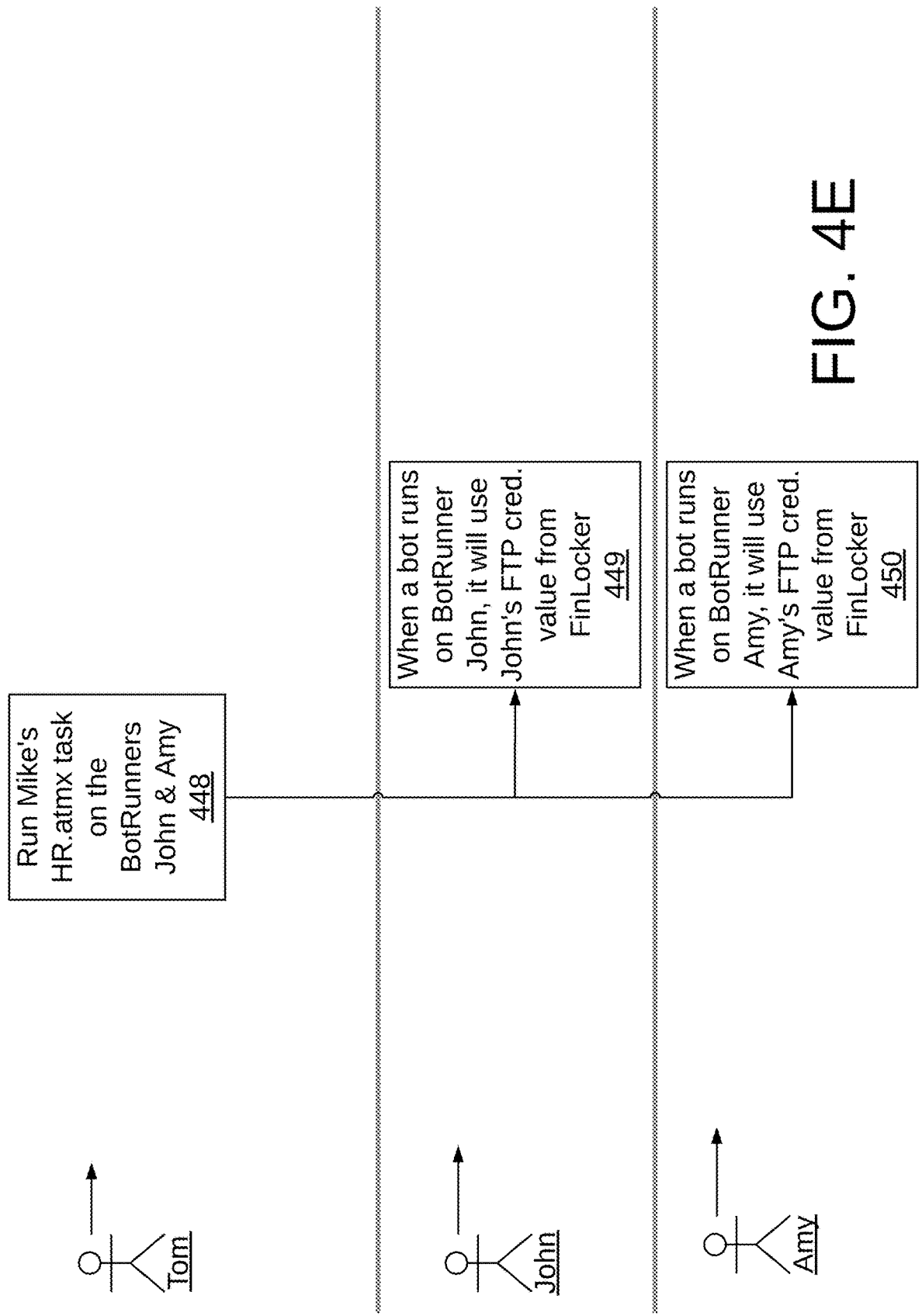

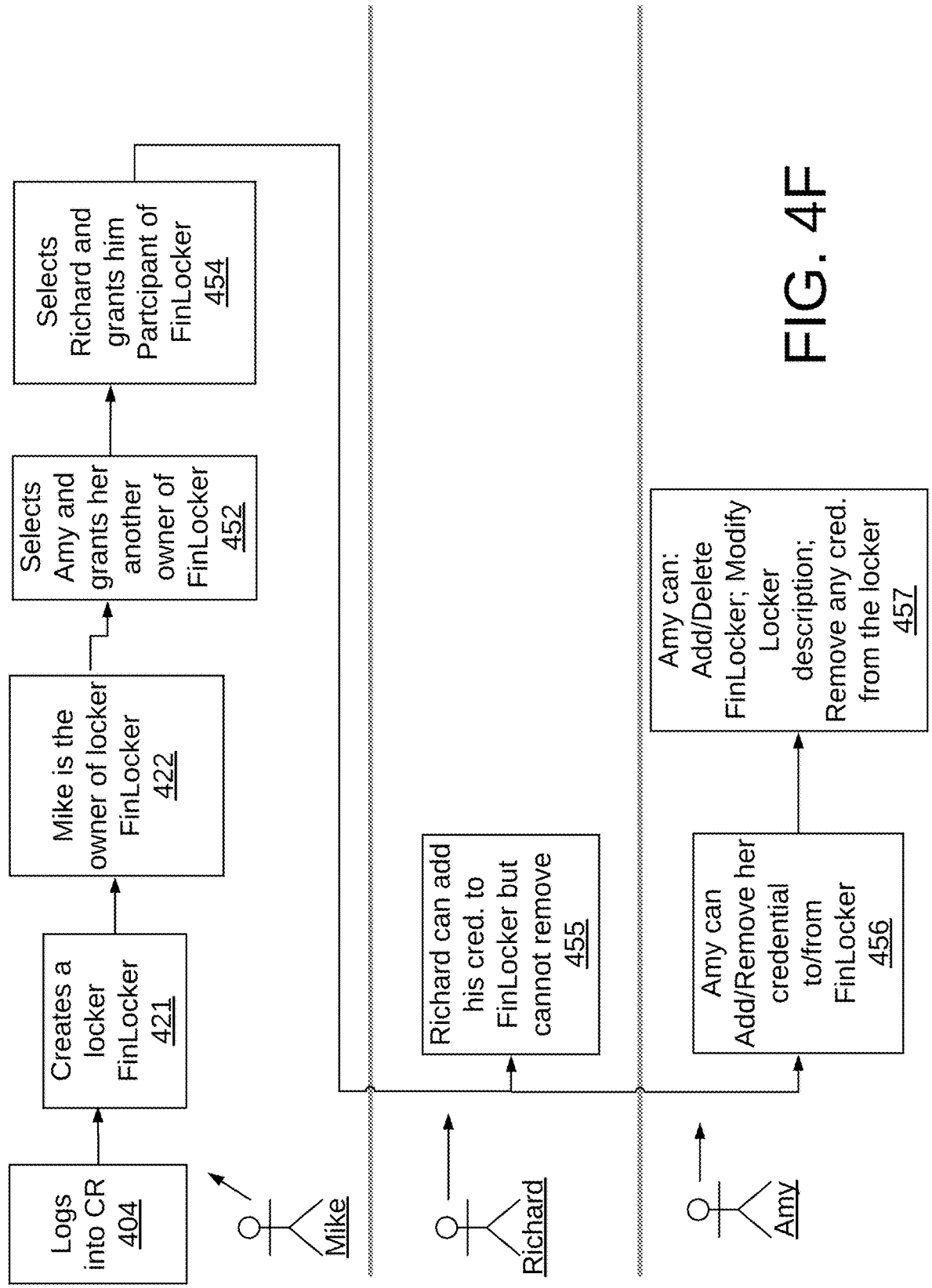

ROBOTIC PROCESS AUTOMATION SYSTEM AND METHOD WITH SECURE CREDENTIAL VAULT

RELATED APPLICATIONS

This application is related to the following pending patent application which assigned to the assignee of the present application: System and Method for Compliance Based Automation, filed in the U.S. Patent Office on Jan. 6, 2016, and assigned application Ser. No. 14/988,877.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure a computer software or a "robot" to capture and interpret existing applications for processing a transaction, manipulating data, triggering responses and communicating with other digital systems. Conventional RPA systems employ software robots to interpret the user interface of third party applications and to execute steps identically to a human user. In certain environments, the robots will encounter information that needs to be protected for various reasons such as confidentiality considerations or privacy or other legal or regulatory requirements. In such environments, care must be taken to ensure that administrators and users, such as creators and operators of the robots have the appropriate credentials to access the protected information. As the number of tasks performed increases and the different types of tasks increases it becomes increasingly difficult to manage access to the protected information, and the consequences of failing to adequately protect the protected information continues to grow. Accordingly, there is a need for improved automation and management of access controls in RPA systems.

SUMMARY

A robotic process automation system with improved security in the form of a credential vault includes data storage for storing a plurality of credentials for bots to login and access software applications. The data storage also stores credentials in encrypted form where the credentials are not associated with any of the plurality of bots. The credentials include standard credentials and user specific credentials. A processor is operatively coupled to the data storage and is configured to execute instructions that when executed cause the processor to provide to a privileged user a control console. The instructions implement a standard credential generator that is operable by a privileged user by way of the control console, to generate a set of standard credentials associated and useable by any authorized user. The instructions also implement a user specific credential generator, operable by the privileged user by way of the control console, to generate a user specific credential template useable by a user to enter credentials specific to the user. The instructions also implement a configurable locker that is stored in encrypted form in the data storage and that is operable by the privileged user and the user, to associate a set of users as a group and to provide selected standard credentials to the group via a locker. A bot deployed by a user of the group obtains standard credentials assigned to the group and user specific credentials of the user that executes the bot.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2B is a table showing rights of various users of an embodiment of a credential vault.

FIGS. 4A, 4B, 4C, 4D, 4E and 4F are flow diagrams illustrating various operations by various types of users of an embodiment of a credential vault.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The centralized credential vault (CV) disclosed herein operates to securely store all credentials and provision them to bots on an on-demand basis. The CV preferably implements NIST controls IA-2 to uniquely identify and authenticate organizational users (or processes acting on behalf of organizational users). Since sensitive credentials need not be stored in bots or on bot runner systems, the CV facilitates a logical separation of credentials from the bots. CV variables are created from a control room and are instantly available to all the bot creators and bot runners registered with the respective CR. The CV adds flexibility and dynamic character to bots since only the credential references are present in the bots and not the credentials. When bots are moved from one environment to another environment, absolutely no change is needed in bots. Bots can seamlessly pick up the credentials values applicable for the new environment from the CR of that environment. Additionally, the CR automatically stores configuration related sensitive data into the CV by default.

Figure 1:
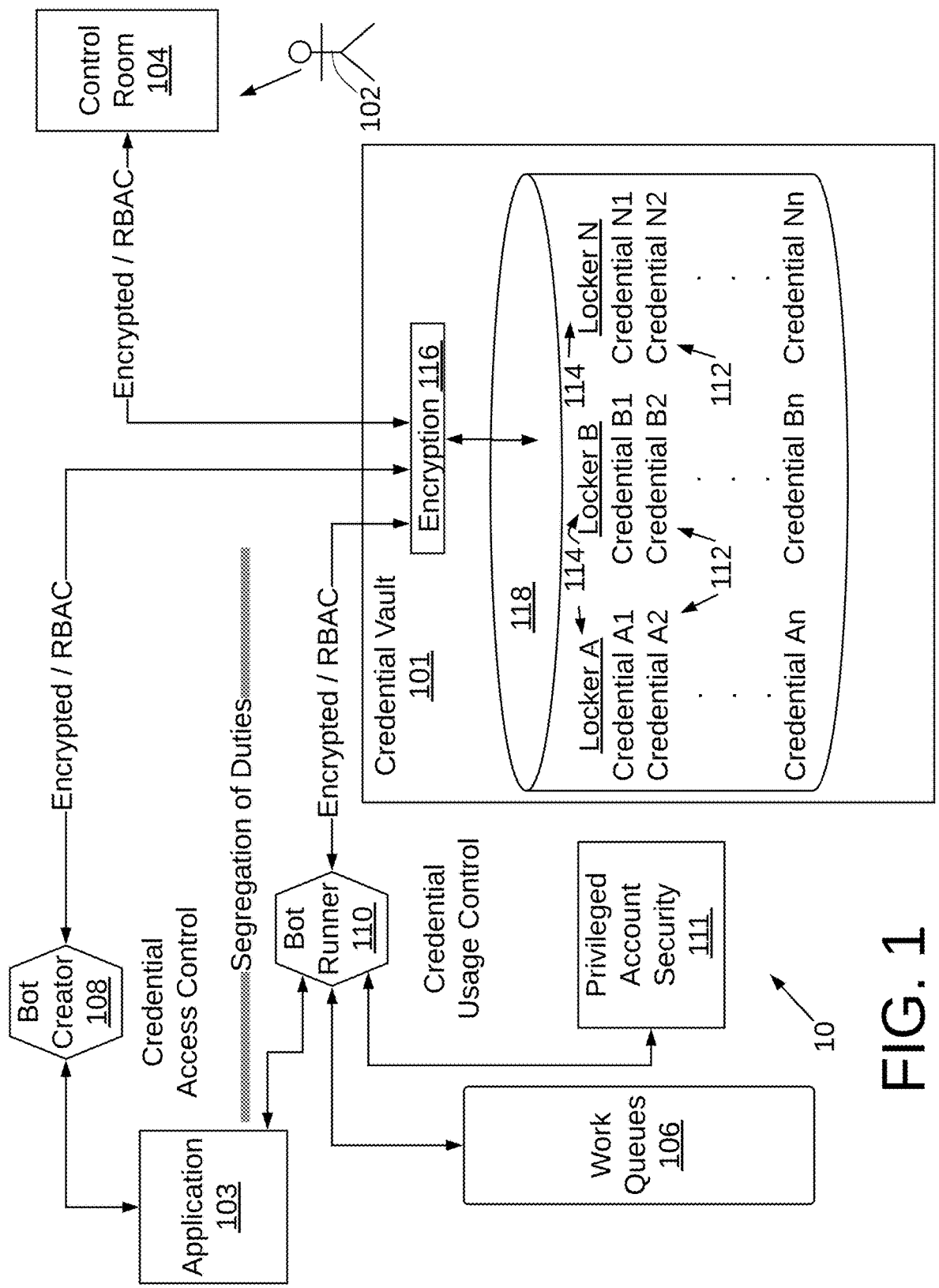
FIG. 1 is a high-level block diagram of an embodiment of an RPA system with a credential vault.

FIG. 1 is a high-level block diagram of an embodiment of an RPA system 10 with a credential vault 101. An authorized user 102 interacts with the RPA system 10 by way of control room module 104 which operates to control processing of tasks within work queues 106. The RPA system 10 implements a bot creator 108 that may be used by an RPA user 102, to create one or more bots that are used to automate various business processes executed by one or more user level computer applications, such as seen at 103. The term "bot" as used herein refers to a set of instructions that cause a computing resource to interact with one or more user level computer applications to perform tasks provided by the one or more user level computer applications. Once created, the bot may be executed by a bot runner 110 to perform the tasks as encoded by the instructions to interact with one or more user level computer applications, such as seen at 103. Advantageously for security, bots can only execute by a command from the control room 104. The bot runner 110 may also employ services provided by a privileged account security service 111 such as provided by CyberArk to access application credentials.

Bot runner 110 takes the form of a player that executes, via a computing device, a bot to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference.

The CV 101 stores credentials 112 that are created by way of CR 104 and used across bot creators 108 and bot runners 110. To further facilitate access control, credentials 112 are further divided in logical groups called lockers, seen at 114. Lockers 114 enable complete separation between the credentials of one department in an organization from another's. For example, users in the finance department of an organization will be able to see credentials in the finance locker, but not in the accounting or HR department lockers.

The credentials 112 are created and managed through a CR 104 user interface. The credentials 112 are advantageously encrypted via an encryption engine 116 (such as to AES-256 bits format) to conform to NIST SC-28 to prevent unauthorized access or disclosure of credentials. Consequently, only encrypted credentials 112 travel from the CR 104 to the database 118 and are stored in the database 118 in encrypted from. In certain embodiments, the data encryption key encrypts all credentials using AES 256-bit key using a FIPS 140-2 Level 1 validated algorithm to meet the NIST IA-7, SC-12 and 13 requirements for implementation of mechanisms for authentication to a cryptographic module that meet the requirements of applicable federal laws.

Role based access control in the system 10 permits fine grained access control to permit differentiation between credential management and consumption. A creator of a locker 114 is the owner of the locker and the owner can invite others to publish credentials 112 into a designated locker 114. A consumer of a credential 112, such as a bot 108 or 110 or a person needs to have the right role to the locker.

Bot creators 108 and bot runners 110 do not store credentials locally. Instead, credentials are advantageously only provisioned during execution of bot creators 108 and bot runners 110. When the credentials are requested by bot runners 110, encoded credentials are provided by the CR 104 to the applicable bot runner 110 over a secure (e.g. HTTPS) protocol. Once credentials usage is over, the credentials are encrypted (eg. to AES-256 bits encryption). Advantageously, encrypted credentials stay in system memory. This ensures that memory mapping tools cannot hack the credentials from system memory. When the bots 108, 110 finish execution, credentials are erased from the memory.

The credential vault 101 permits all sensitive data to be stored in encrypted form. Along with the credentials created from the CR 104, the following data may also be encrypted and securely stored in the CV 101: user credentials for auto-login to bot runners 110, connectivity details for a version control system, connectivity details of an SMTP server. Passwords entered in the application or any other sensitive information are not stored on the client machine, rather they are encrypted and stored into the CV 101 using for example a SHA256 algorithm after salting.

Figure 2A:
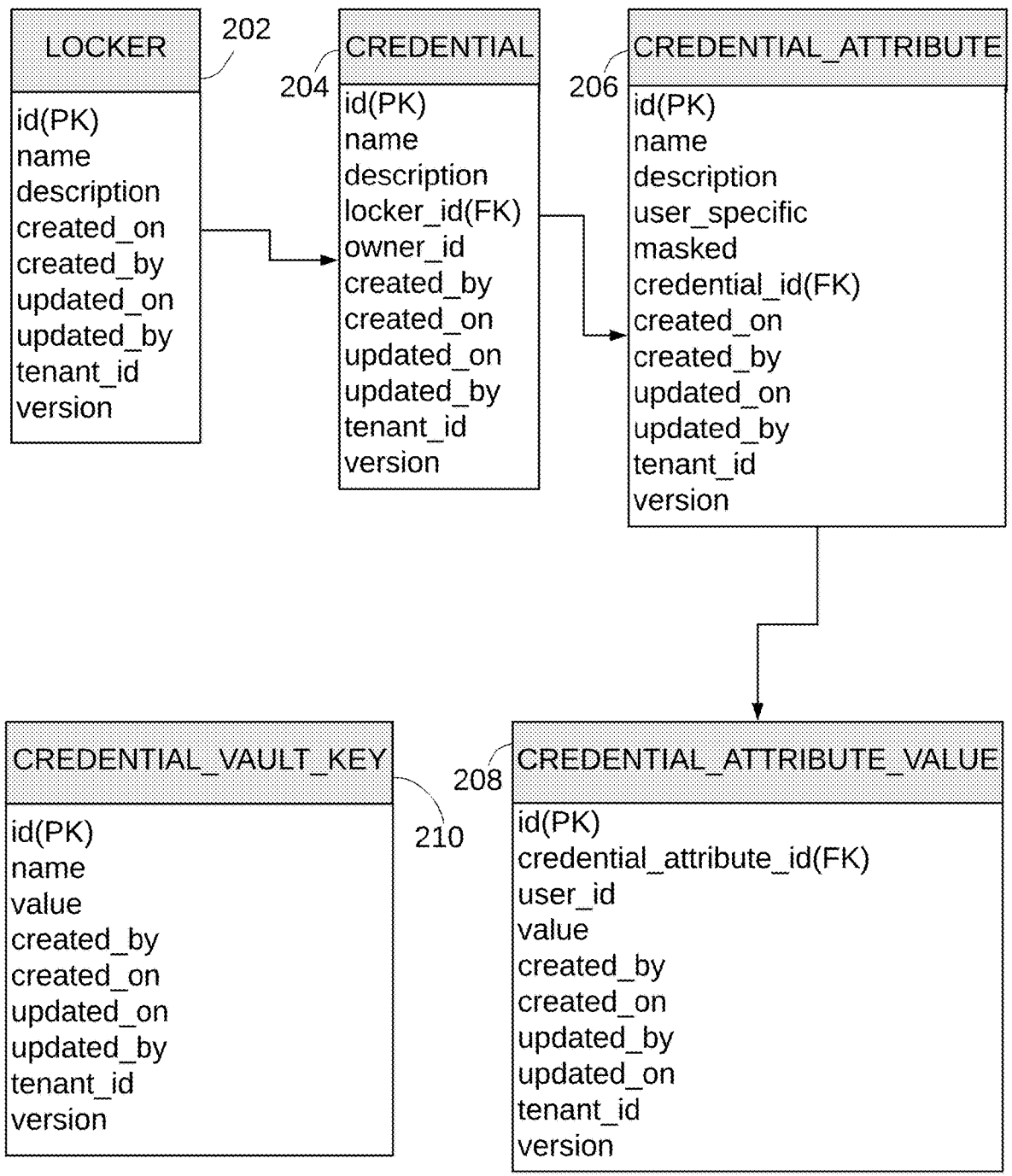
FIG. 2A is a diagram of a database schema for an embodiment of a credential vault.

FIG. 2A is a diagram of a database schema for an embodiment of credential vault 101. LOCKER table 202 stores information related to lockers 114. CREDENTIAL table stores information related to credentials 112. CREDENTIAL_REDENTIAL_ATTRIBUTE table 206 stores attributes of credentials 112. CREDENTIAL_ATTRIBUTE_VALUE table 208 is used to store values of credentials 114. CREDENTIAL_VAULT_KEY table 210 is used to store public and data keys. As seen, table 202 is linked to table 204 which is linked to table 206 which is linked to table 208. The CV 101 advantageously provides support for standard and user specific credential types, as seen in the attribute user_specific in the table 206. Each credential 112 is characterized by a structure, as seen in the attribute credential_attribute_id(FK) in table 208. For example, a credential for an ftp server will have attributes for: server name, user name and password. As seen, the lockers 114 are logical constructs which are stored in database 118.

FIG. 2B is a table showing rights of various users of an embodiment of a credential vault. A user can be characterized as one or more of five privilege types: consume, participate, own, share, admin. Each user privilege type has the rights as shown across the top of the table in FIG. 2B: view locker, edit locker, delete locker, add participant/owner, remove participant/owner, view credential, assign credential, remove credential, user-specific value, common value. In the table of FIG. 2B, "Y" indicates presence of a right for a particular privilege type and "N" indicates absence of a right for a particular privilege type.

A locker 114 has associated there with one more privileges and as seen in the table of FIG. 2B a user has an associated set of credentials 114 and the user can only add/modify credentials 114 if the user possesses the appropriate privilege. An administrator or privileged user, such as user 102 uses control room 104 to manage credentials for each user. The CR 104 preferably implements Least Privileges and Separation of Duties through a configurable Role Based Access Control (RBAC). Authorized users can also temporarily or permanently suspend users, per business needs. RBAC enforces session handling to prevent any unauthorized use. If an unauthorized user attempts to view session details or to gain unauthorized access, the CR 104 does not allow the user to proceed and immediately terminates the unauthorized user's session. This user will be forced to login with his/her own credentials again. Moreover, inactive accounts can be disabled. The CV 101 also permits an administrator to transfer a locker 114 from one person to another.

Figure 3A:
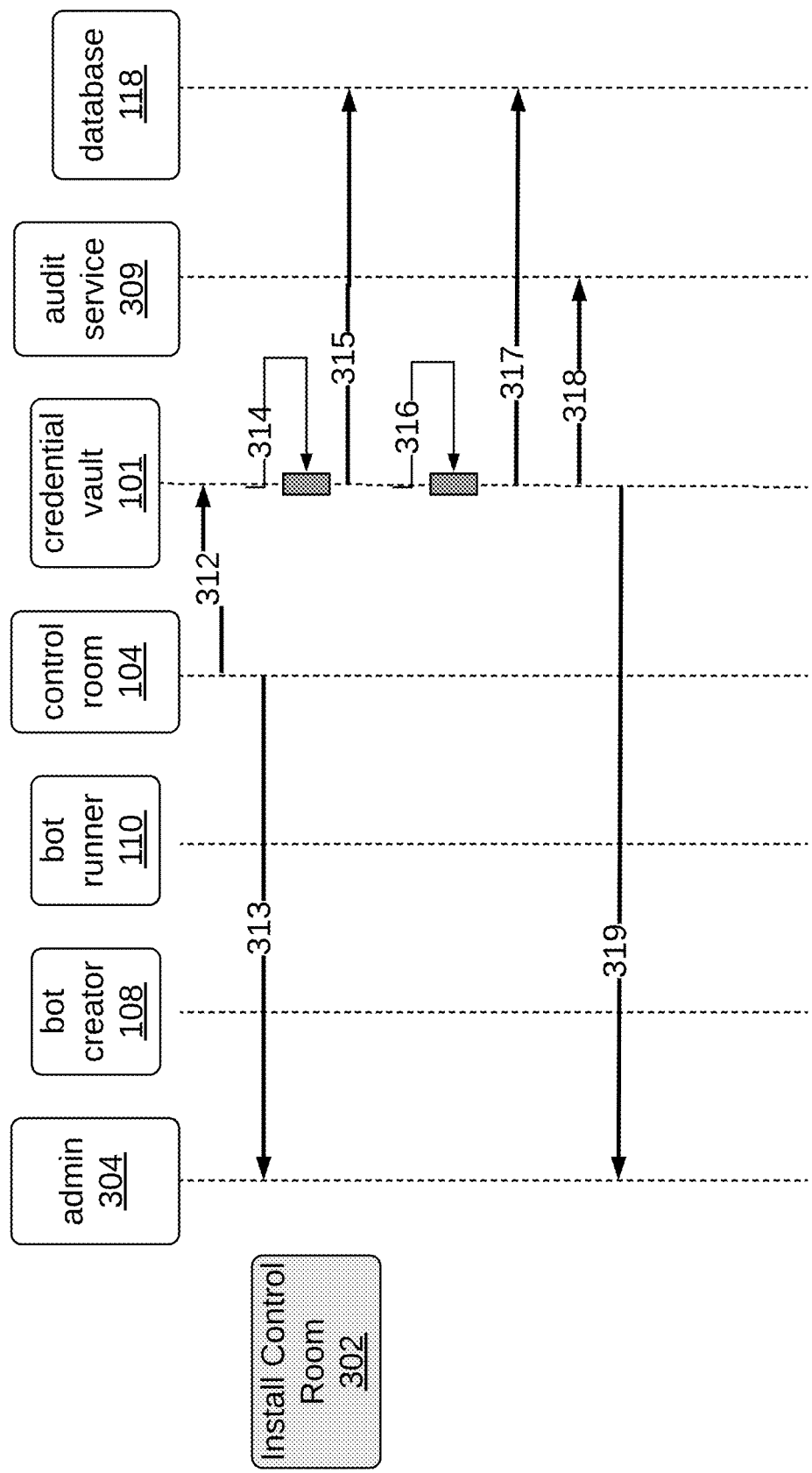
FIGS. 3A, 3B, 3C, 3D, 3E are sequence diagrams illustrating details of implementation of certain operations of an embodiment of a credential vault.
Figure 3B:
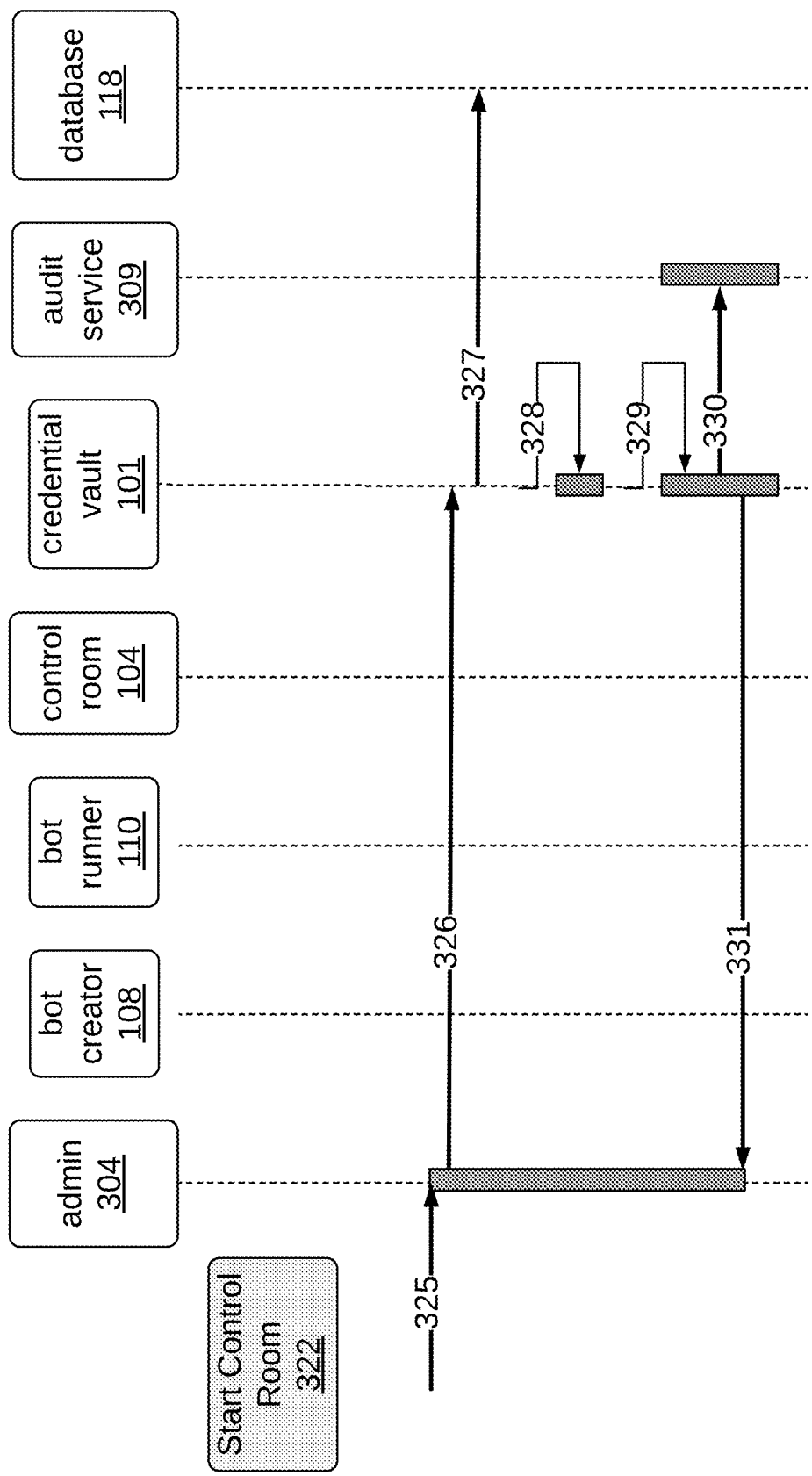

FIGS. 3A, 3B, 3C, 3D, 3E are sequence diagrams illustrating details of implementation of certain operations of an embodiment of credential vault 101. FIG. 3A illustrates sequence of events for an install control room operation 302. The sequence diagram shows requestors and providers of various services across the top, specifically, administrator 304, bot creator 108, bot runner 110, control room 104, credential vault service 101, audit service 309, and database 118. The install control room operation 302 is initiated by issuance of a master key request 312 from control room 104 to credential vault 101. The credential vault 101 responds by generating a master key pair 314 which is stored 315 to the database 118. The credential vault next generates a data key 316 which is also stored 317 to the database 118. An audit log entry 318 is next made to the audit service 309 and a master key (private key) 319 is returned to the admin 304. As seen, installation of the CR 104 generates the following 3 keys:

Master (Private) key: managed by admin user outside of the system 10. Its only use is to unlock the CV 101. The admin must enter the master key every time the CR 104 is restarted. Once the CV 101 is open, the master key is immediately erased from memory and it is not stored anywhere within the system 10.

Public key: stored in the CR database 118 and is used in conjunction with the master key manually entered by the user to unlock the CV 101.

Data encryption key: stored in the CR database 118 along with the public key and is used to encrypt and decrypt the credentials 112 at the time of storage or provisioning. This key itself is encrypted using the master key. The data encryption key does not leave the CV 101 at any time. Credential 112 encryption and decryption is done at the CV 101.

To meet NIST IA-5 PKI-based authentication requirements, the CR 104 employs a deliberate methodology to manage the content of PKI. The CV 101 gets automatically locked every time the CR 104 service is down. When the CR service 104 is started again, the CV 101 must be unlocked through a combination of the public and private keys. This ensures that there is no single point of failure, even if someone hacks into database 118 and gets access to the public key, credential security is not compromised since the private key is stored externally.

FIG. 3A illustrates a sequence of events for a start control room operation 322. The start control room operation 322 is initiated by issuance of an unlock vault command 325 by the admin 304 which causes transmission to the CV 101 of an unlock command together with the admin 304's master key. The CV 101 responds by issuing a get public key request 327 to the database 118. The CV 101 then generates at 328, with the received public key, a token, encrypts it with the public key, decrypts it with the master key and performs a match. A successful match results in decryption at 329 of the data key which is retained in memory. An audit log entry 330 is next made to the audit service 309 and a vault unlocked message 331 is provided to the admin 304.

Figure 3C:
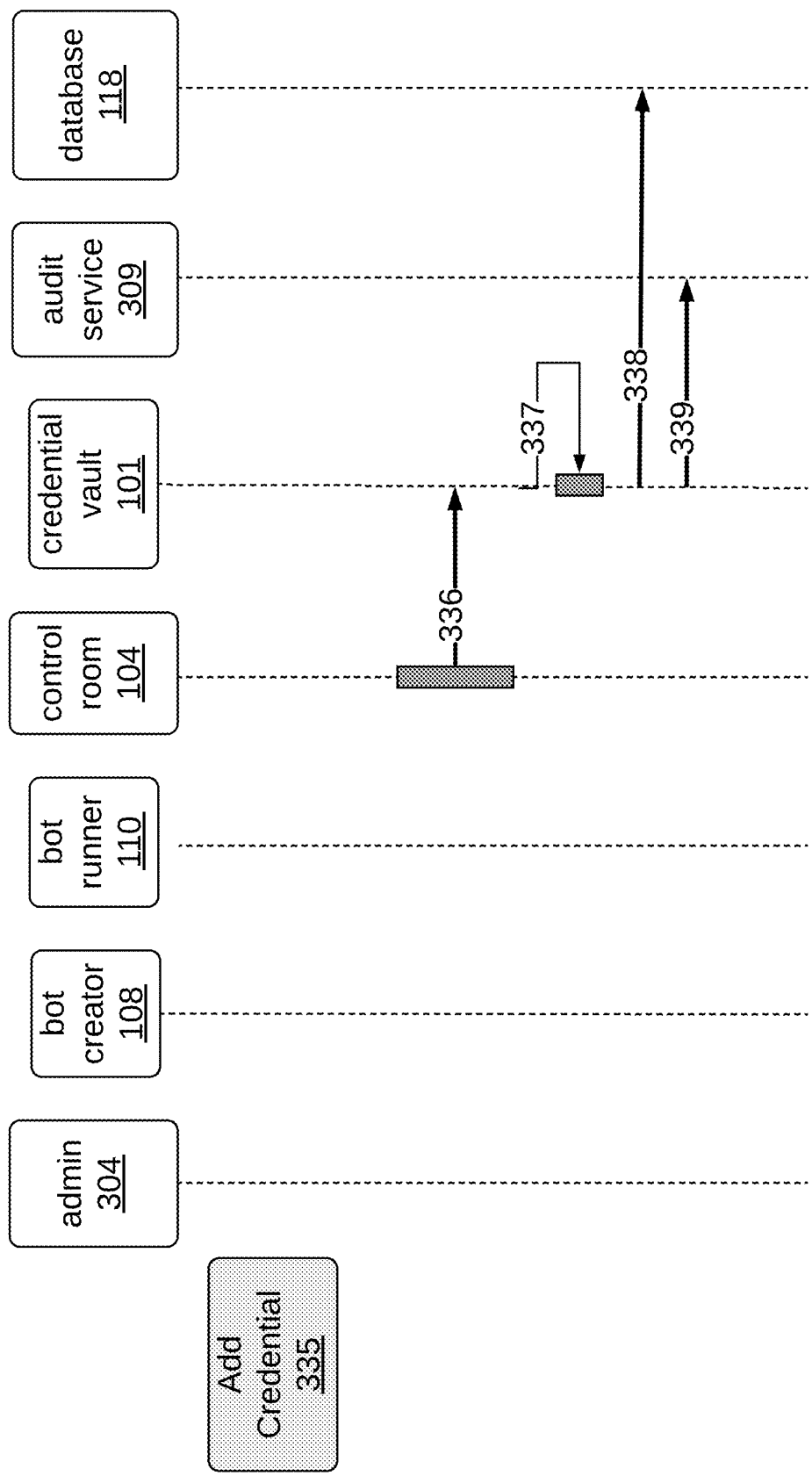
Figure 3D:
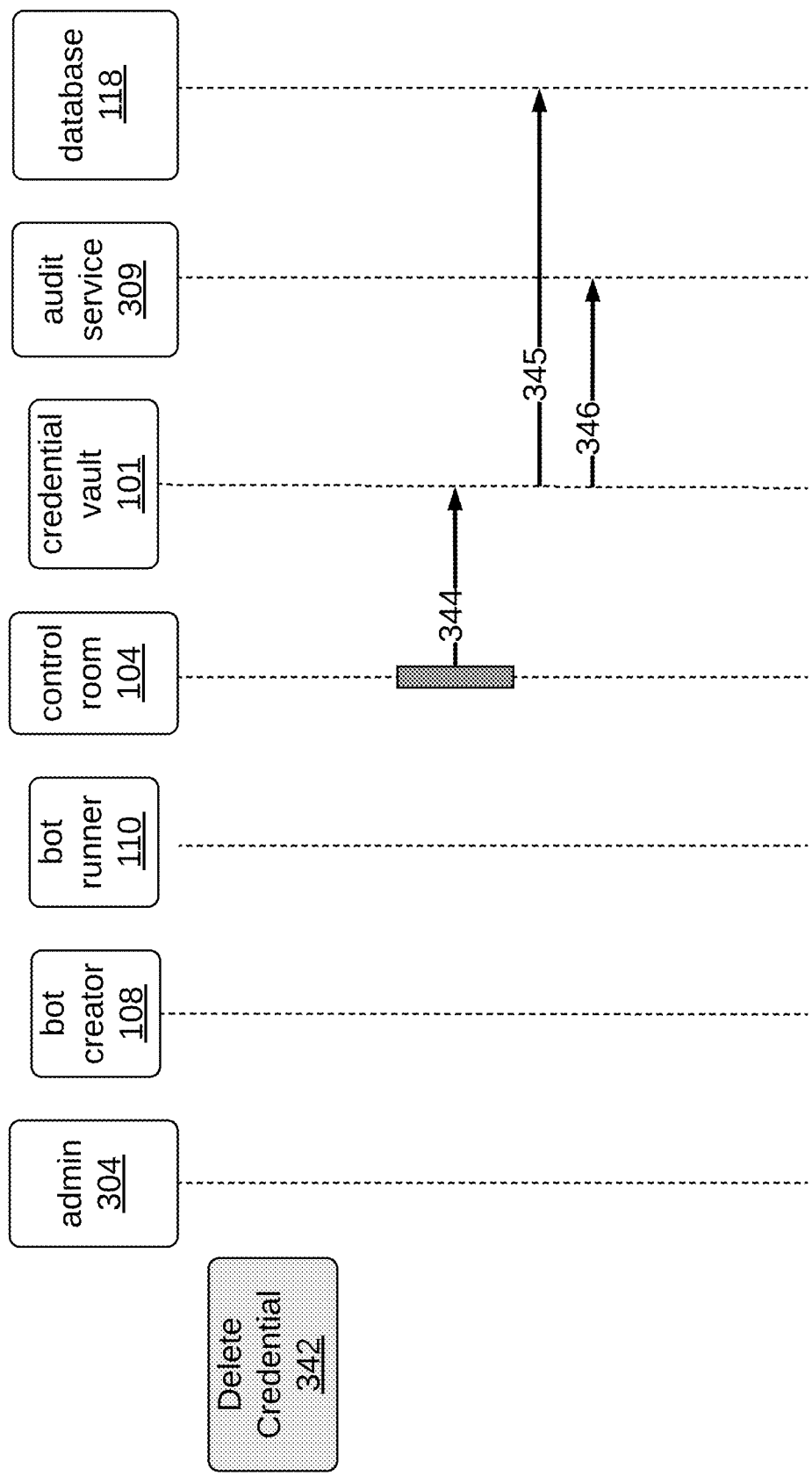

FIG. 3C illustrates a sequence of events for an add credential operation 335. The add credential operation 335 is initiated by issuance of an add credential request 336 from control room 104 to CV 101, which responds by encrypting at 337 the received credential information with the data key and the encrypted credentials are stored at 338 to the database 310. An audit log entry 339 is next made to the audit service 309. FIG. 3D illustrates a sequence of events for a delete credential operation 342. The delete credential operation 342 is initiated by issuance of a delete ad credential request 344 from control room 104 to CV 101, which responds by issuing a delete credential command 345 to database 118 and issuing an audit log entry 346 to the audit service 309.

Figure 3E:
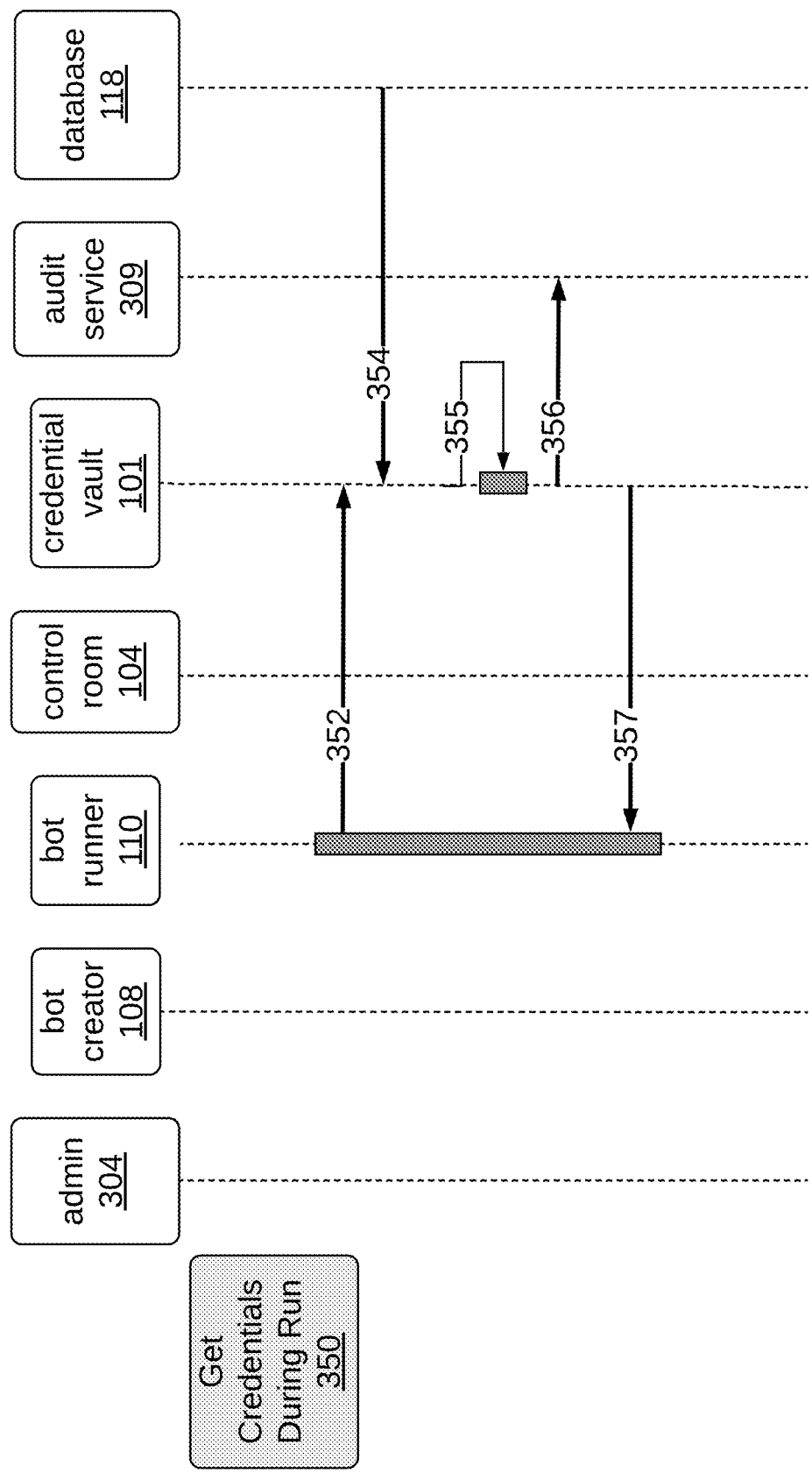

FIG. 3E illustrates a sequence of events for a get credentials during run, ie. a bot runner 110 operation, 350. The get credentials during run operation 350 is initiated by issuance of a get credentials request 352 by bot runner 110 to CV 101, which responds by retrieving at 354 encrypted credentials from database 118. The CV 101 then at 355 decrypts the credentials with the data key and an audit log entry 356 is made to the audit service 309. The credentials 112 are then returned to the bot runner 110.

Figure 4A:
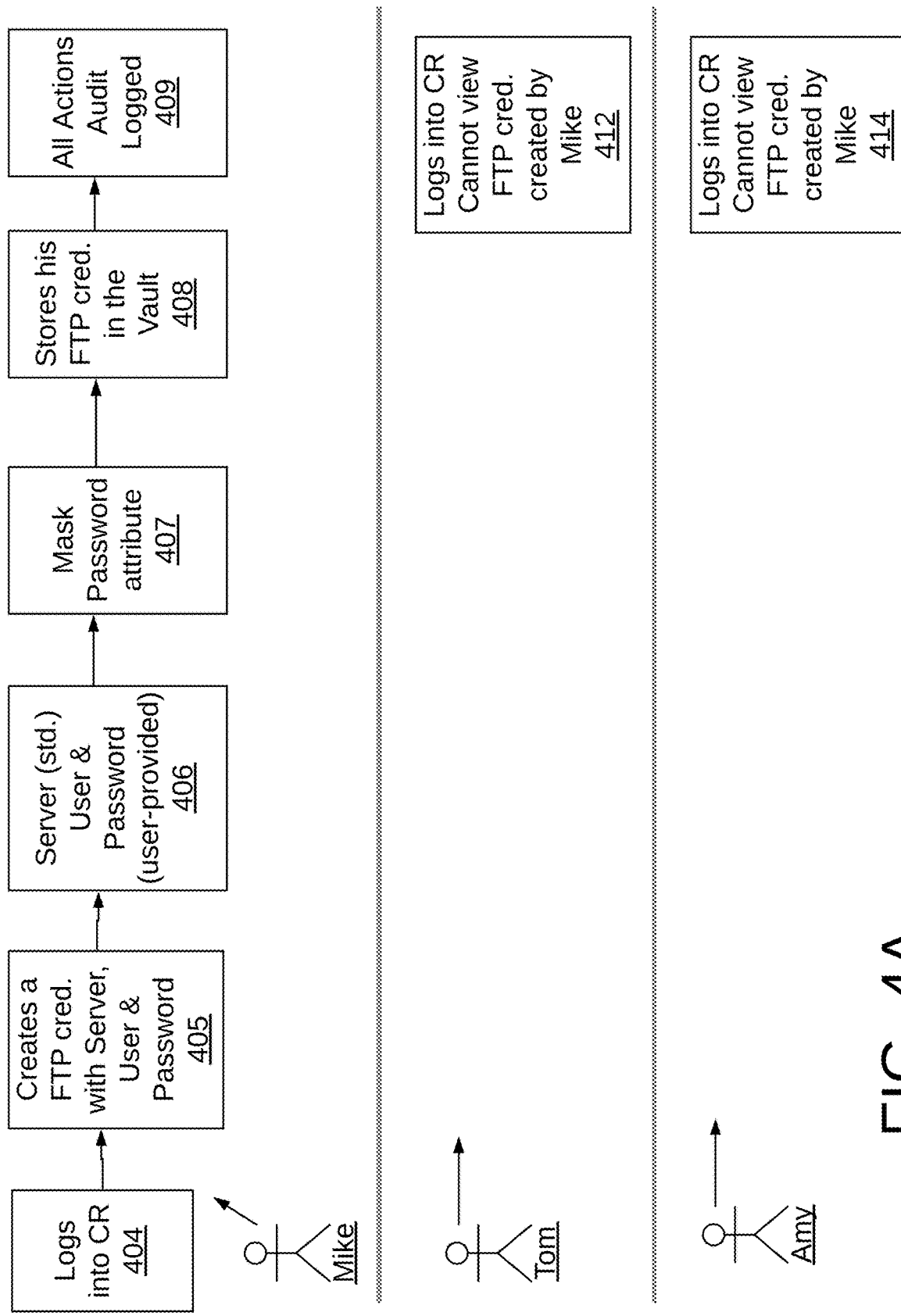

FIGS. 4A, 4B, 4C, 4D, 4E and 4F are flow diagrams illustrating various operations by various types of users of an embodiment of a credential vault. FIG. 4A illustrates a user Mike creating his own credentials. Mike at 404 logs into CR 104. He then at 405 creates a FTP credential 112 with a server id, user id and password. As seen at 406, the server id is standard, and the user id and password are user provided by Mike. The system 10 at 407 masks Mike's password attribute and stores at 408 his FTP credentials in the CV, and as seen at 409 logs all of the actions. Tom who is an automation runner/consumer (i.e. to execute a bot on a runner) at 412 logs into the CR 104 but cannot view the FTP credentials created by Mike. Also, Amy who is an automation runner/consumer at 414 logs into the CR 104 but cannot view the FTP credentials created by Mike.

FIG. 4B illustrates creation of a locker 112. In FIG. 4B, Mike, who is an automation expert (i.e. knows the domain of automation), logs into the CR 104 at 404. At 421, he creates a locker named FinLocker. As seen at 422 because Mike created FinLocker, he is designated as the owner. Tom, who is a manager of automations creates at 423 a FinOps Role associated with the locker FinLocker and at 424 adds John and Amy to the role. As seen at 425, John and Amy inherit the FinOps permission.

Figure 4C:
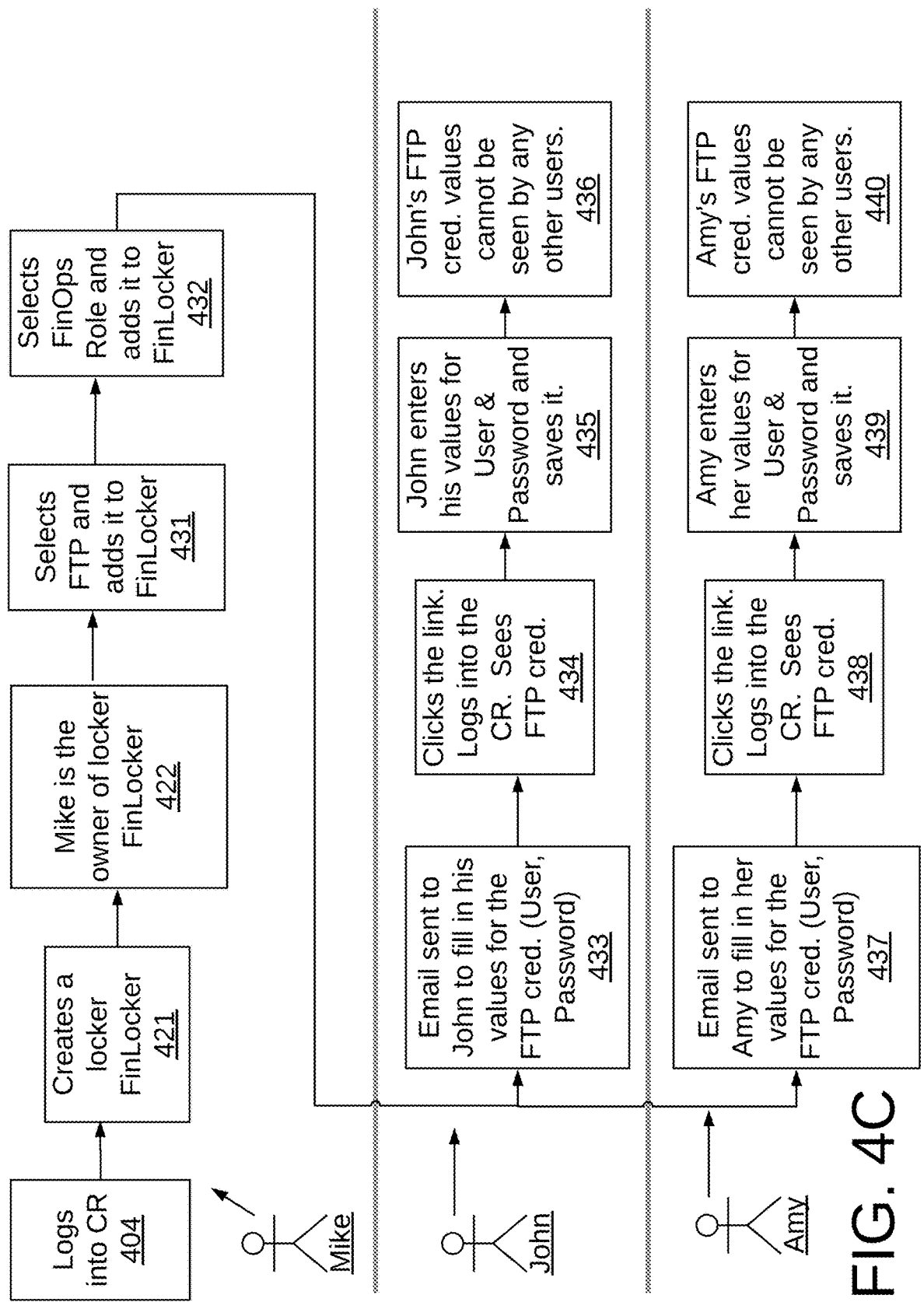

FIG. 4C illustrates granting of usage permission. Mike, an automation expert logs into the CR at 404 and at 421 creates a locker named FinLocker and at 422 is designated as the owner of FinLocker. At 431, Mike selects the FTP credential 112 and adds it to the FinLocker. He then at 432 selects the FinOps role and adds it to the FinLocker. John who is an automation runner/consumer with a role of FinOps at 433 receives an email to fill in his values for the FTP credential. At 434 John clicks on the link received in the email, logs into the CR 104 and sees the credential. AT 435, John enters the values for the FTP credential and saves them. As seen at 436, John's FTP credential values cannot be seen by any other users. Amy, who is also an automation runner/consumer with a role of FinOps and at 437, 438, 439 performs the steps performed by John at 433, 434 and 435. As seen at 440, as with John, Amy's FTP credential values cannot be seen by any other users.

Figure 4D:
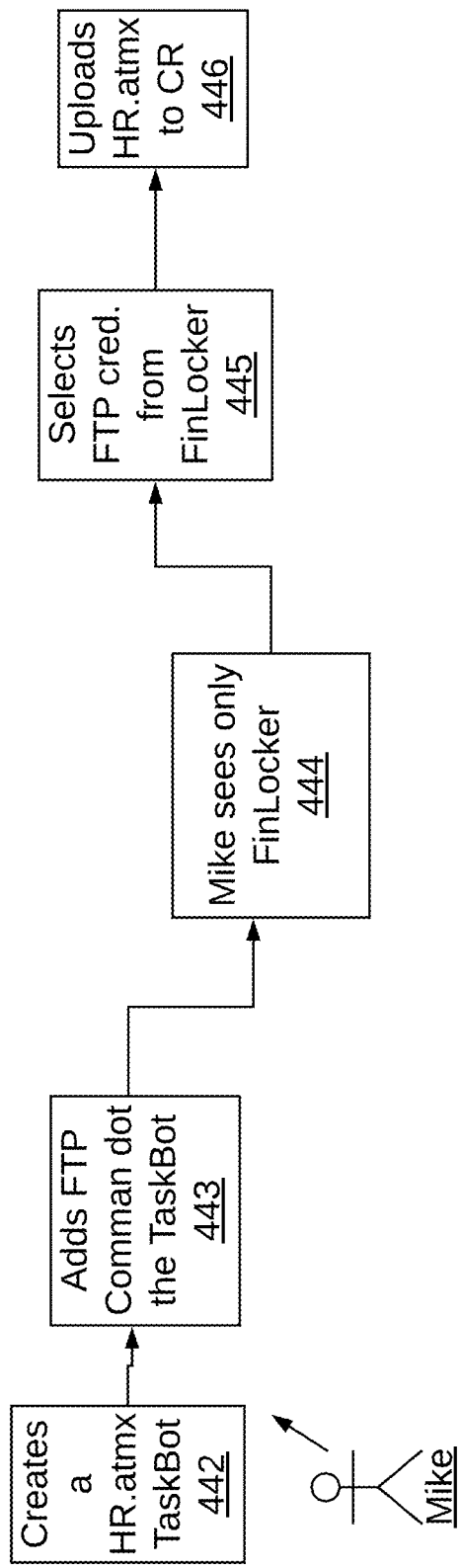

FIG. 4D illustrates access of credentials in a bot creator 108. Mike, an automation expert creates at 442 a bot named HR.atmx. At 443 he adds an FTP command to the bot HR.atmx. As noted at 444, Mike sees only those lockers 114 and the credentials 112 within for which he has usage permission via his role. At 445, Mike selects his FTP credentials from the locker FinLocker and at 446 uploads the bot HR.atmx to the CR 104.

FIG. 4E illustrates running of a bot runner 110 using user provided credential values. Tom, an automation operator, at 448 runs Mike's HR.atmx bot on bot runners 110 assigned to John and Amy. For standard credentials the same value is used by all consumers. For user provided credentials, a user specific value is used by each consumer. As seen at 449, for John, an automation consumer with a FinOps role, when a bot runner 110 is executed, it will use John's FTP credentials from the locker 114 named FinLocker. Similarly, for Amy, another automation runner/consumer with a FinOps role, when a bot runner 110 is executed, it will use Amy's FTP credentials from the locker 114 named FinLocker.

FIG. 4F illustrates granting of access permission. Mike, an automation expert, at 404 logs into the CR 104 and creates at 421 a locker, FinLocker. As seen at 422 Mike is the owner of the locker 422. At 452, Mike selects Amy and grants her rights as another owner of FinLocker. At 454 Mike selects Richard and grants him rights as a participant of FinLocker. This causes a notification to be sent to Richard to enter his user defined credentials to FinLocker. As seen at 455, Richard can add his credentials 112 to FinLocker but cannot remove them as he is a participant. In contrast, Amy who is an owner can add and remove her credentials 112 from the locker 114 FinLocker. Also, as seen at 457 Amy has a number of other permissions for the locker 114 FinLocker: add, delete, modify locker description, and remove any credential. In the locker 114 if you are the owner of credential then only you can overwrite your masked credential values while editing. If you are not an owner of a credential, unless it's marked common, it will be shown masked all the time.

As may be appreciated from the above, granting a user rights to enter credentials causes a notification to be sent to the user to enter their credentials. Also, user login to the system automatically causes retrieval of their credentials. Moreover, if a user role doesn't have access to a set of bot runners 110 the user will never see those bot runners. Moreover, administration roles can be further segmented for separation of administrative tasks.

As seen, from the foregoing description, the CV 101 and CR 104 together provide a number of advantageous features. Segregation of duties is achieved with fine grained RBAC, on credential management and consumption. The fine grained nature is by role, so if you create a credential locker you are the owner and you can then invite others to publish credentials into your locker, and to consume locker you need to have the right role. To publish to locker you need to be an owner or participant and for consumption the role has to be consistent with that required by the appropriate locker. For instance, a user may be granted privileges to execute bots on bot runners 110 but have no access to the bot creators 108.

Figure 5:
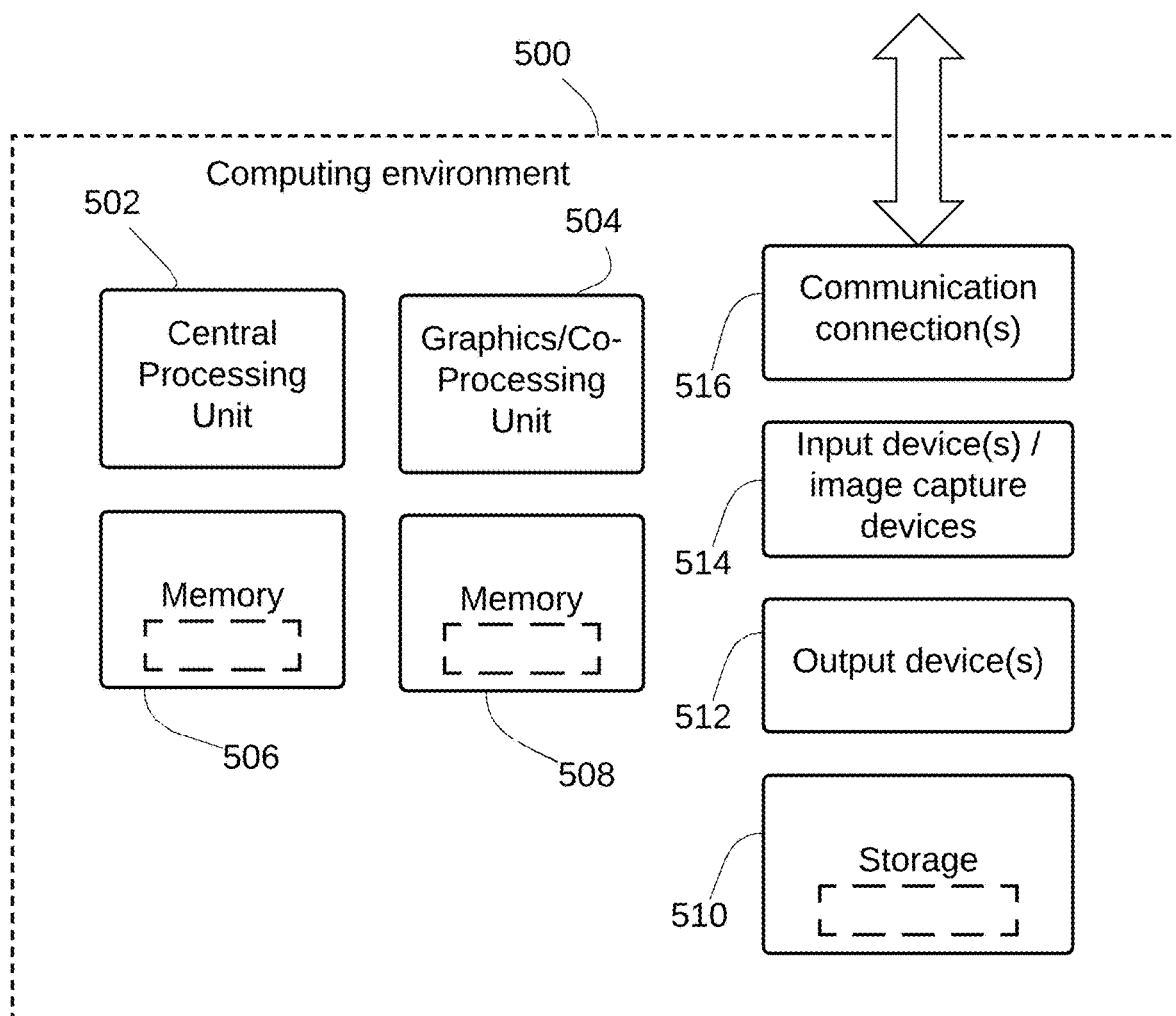
FIG. 5 illustrates a block diagram of hardware that may be employed in an implementation of the RPA system as disclosed herein.

FIG. 5 illustrates a block diagram of hardware that may be employed in an implementation of the RPA system as disclosed herein. FIG. 5 depicts a generalized example of a suitable general-purpose computing system 500 in which the described innovations may be implemented in order to improve the processing speed and efficiency with which the computing system 500 operates to perform the functions disclosed herein. With reference to FIG. 5 the computing system 500 includes one or more processing units 502, 504 and memory 506, 508. The processing units 502, 506 execute computer-executable instructions. A processing unit can be a general-purpose central processing unit (CPU), processor in an application-specific integrated circuit (ASIC) or any other type of processor. The tangible memory 506, 508 may be volatile memory (e.g., registers, cache, RAM), non-volatile memory (e.g., ROM, EEPROM, flash memory, etc.), or some combination of the two, accessible by the processing unit(s). The hardware components in FIG. 5 may be standard hardware components, or alternatively, some embodiments may employ specialized hardware components to further increase the operating efficiency and speed with which the system 100 operates.

Computing system 500 may have additional features such as for example, storage 510, one or more input devices 514, one or more output devices 512, and one or more communication connections 516. An interconnection mechanism (not shown) such as a bus, controller, or network interconnects the components of the computing system 500. Typically, operating system software (not shown) provides an operating system for other software executing in the computing system 500, and coordinates activities of the components of the computing system 500.

The tangible storage 510 may be removable or non-removable, and includes magnetic disks, magnetic tapes or cassettes, CD-ROMs, DVDs, or any other medium which can be used to store information in a non-transitory way and which can be accessed within the computing system 500. The storage 510 stores instructions for the software implementing one or more innovations described herein.

The input device(s) 514 may be a touch input device such as a keyboard, mouse, pen, or trackball, a voice input device, a scanning device, or another device that provides input to the computing system 500. For video encoding, the input device(s) 514 may be a camera, video card, TV tuner card, or similar device that accepts video input in analog or digital form, or a CD-ROM or CD-RW that reads video samples into the computing system 500. The output device(s) 512 may be a display, printer, speaker, CD-writer, or another device that provides output from the computing system 500.

The communication connection(s) 516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer implemented method for robotic process automation comprising:
   managing by a control room server a plurality of stored bots, each bot comprising a set of encoded instructions to perform user level interaction with an application program;
   the control room server useable by authorized users and operating to
   permit creation of standard credentials useable by any authorized user, and user specific credential templates useable by a user to enter credentials specific to the user;
   cause deployment of selected bots, each selected bot deployed to a bot runner that executes on a computing device; and
      manage a credential vault that operates to securely store credentials in encrypted form and provide the credentials to the bot runners as requested by the bot runners,
      wherein the credential vault is configurable to comprise a plurality of lockers, each locker operable by a privileged user, to associate a set of users as a group and to provide selected standard credentials to the group.

2. The computer implemented method of claim 1 wherein the credentials are transferred from data storage to volatile memory in encrypted form and are decrypted and stored in the volatile memory in unencrypted form and are erased from the volatile memory when use by a bot runner that executes on a computing device is complete.

3. The computer implemented method of claim 1 wherein the credential vault further comprises a configurable locker that has associated therewith one or more privileges, wherein the privileges can be modified only by users possessing appropriate privileges.

4. The computer implemented method of claim 3 wherein users may be assigned one or more roles and wherein the configurable locker associates privileges for a user with a role of the user.

5. The robotic process automation system of claim 1 wherein installation of the control room server causes generation of:
   a master key usable by the administrator to unlock the credential vault;
   a public key employed in conjunction with the master key to unlock the credential vault; and
   a data encryption key, that is encrypted with the master key, and used to encrypt credentials upon storage and retrieval.

6. The robotic process automation system of claim 5 wherein the master key is erased from memory upon initiation of the control room server.

7. The robotic process automation system of claim 5 wherein the data encryption key remains in the credential vault during encryption and decryption of credentials.

8. A robotic process automation system comprising:
   data storage for storing,
   a plurality of bots, each bot comprising one or more configurable commands arranged to perform assigned tasks to interact with one or more user level applications,
   credentials in encrypted form and not associated with any of the plurality of bots, the credentials comprising standard credentials and user specific credentials; and
   a processor operatively coupled to the data storage and configured to execute instructions that when executed cause the processor to provide to an administrator a control console, the instructions implementing:
      a standard credential generator, operable by a privileged user by way of a control console, to generate a set of standard credentials associated with and useable by any authorized user;
      a user specific credential generator, operable by the privileged user by way of the control console, to generate a user specific credential template useable by a user to enter credentials specific to the user;
      a configurable locker, stored in encrypted form in the data storage, operable by the privileged user, to associate a set of users as a group and to provide selected standard credentials to the group; and
         wherein a bot deployed by a user of the group obtains standard credentials assigned to the group and user specific credentials of the user of the group that deploys the bot.

9. The robotic process automation system of claim 8 wherein the credentials are transferred from the data storage to volatile memory in encrypted form and are decrypted and stored in the volatile memory in unencrypted form and are erased from the volatile memory when use by a requesting bot is complete.

10. The robotic process automation system of claim 8 wherein the configurable locker has associated therewith one or more privileges, wherein the privileges can be modified only by users possessing appropriate privileges.

11. The robotic process automation system of claim 10 wherein users may be assigned one or more roles and wherein the configurable locker associates privileges for a user with a role of the user.

12. The robotic process automation system of claim 8 wherein installation of the control console causes generation of:
   a master key usable by the administrator to unlock the configurable locker;
   a public key employed in conjunction with the master key to unlock the configurable locker; and
   a data encryption key, that is encrypted with the master key, and used to encrypt credentials upon storage and retrieval.

13. The robotic process automation system of claim 12 wherein the master key is erased from memory upon initiation of the control console.

14. The robotic process automation system of claim 12 wherein the data encryption key remains in the configurable locker during encryption and decryption of credentials.

15. A tangible storage medium, having stored thereupon one or more program modules comprising computer-executable instructions for execution on a computer system, the computer-executable instructions executing on a server processor to cause the computer system to implement a robotic process automation system by:
   operating with data storage to store,
   a plurality of bots, each bot comprising one or more configurable commands arranged to perform assigned tasks to interact with one or more user level applications,
   credentials in encrypted form and not associated with any of the plurality of bots, the credentials comprising standard credentials and user specific credentials; and
   providing to an administrator a control console, the computer-executable instructions implementing:

a standard credential generator, operable by an administrator by way of the control console, to generate a set of standard credentials associated and useable by any authorized user;

a user specific credential generator, operable by the administrator by way of the control console, to generate a user specific credential template useable by a user to enter credentials specific to the user;

a configurable locker, stored in encrypted form in the data storage, operable by the administrator and the user, to associate a set of users as a group and to provide selected standard credentials to the group; and wherein a bot deployed by a user of the group obtains standard credentials assigned to the group and user specific credentials of the user of the group that deploys the bot.

16. The tangible storage medium of claim 15 wherein the credentials are transferred from data storage to volatile memory in encrypted form and are decrypted and stored in the volatile memory in unencrypted form and are erased from the volatile memory when use by a bot is complete.

17. The tangible storage medium of claim 15 wherein the configurable locker has associated therewith one or more privileges, wherein the privileges can be modified only by users possessing appropriate privileges.

18. The tangible storage medium of claim 17 wherein users may be assigned one or more roles and wherein the configurable locker associates privileges for a user with a role of the user.

19. The robotic process automation system of claim 15 wherein installation of the control console causes generation of:

a master key usable by the administrator to unlock the configurable locker;

a public key employed in conjunction with the master key to unlock the configurable locker; and a data encryption key, that is encrypted with the master key, and used to encrypt credentials upon storage and retrieval.

20. The robotic process automation system of claim 19 wherein the master key is erased from memory upon initiation of the control console and wherein the data encryption key remains in the configurable locker during encryption and decryption of credentials.

\* \* \* \* \*